Aug. 21, 1962    E. A. J. MARCATILI ETAL    3,050,699
MILLIMETER WAVE HYBRID JUNCTION
Filed Dec. 23, 1960    2 Sheets-Sheet 1

INVENTORS E. A. J. MARCATILI
D. H. RING
BY
ATTORNEY

INVENTORS E. A. J. MARCATILI
D. H. RING
ATTORNEY

3,050,699
MILLIMETER WAVE HYBRID JUNCTION
Enrique A. J. Marcatili, Fair Haven, and Douglas H. Ring, Red Bank, N.J., assignors to Bell Telephone Laboratories, Incorporated, New York, N.Y., a corporation of New York
Filed Dec. 23, 1960, Ser. No. 77,928
8 Claims. (Cl. 333—11)

This invention relates to electromagnetic wave transmission and, more particularly, to four port devices commonly known as hybrid junctions for use with wave energy in the circular electric wave mode.

During the past several years, research and development of long distance hollow pipe wave guide systems has moved rapidly ahead. When wave guide links of the order of miles are contemplated, however, transmission losses inherent in the guiding means become a primary consideration. The well-known dominant $TE_{10}$ mode in wave guide of rectangular transverse cross section and the $TE_{11}$ mode in wave guide of circular transverse cross section are both characterized by losses per unit distance which exceed the practical limits for long distance transmission. Thus, these well-known wave modes, together with the numerous wave guide components such as couplers, hybrid junctions, attenuators, mode filters, isolators and the like which have been devised for use with these modes, have little application in long distance guide systems. Furthermore, both the range of frequencies useful for communication purposes as well as the band width of frequencies transmitted in a single system have been increasing, and it is desirable that the particular mode chosen for long distance wave guide transmission purposes have an attenuation versus frequency characteristic which decreases as frequency increases. The $TE_{01}$, or circular electric, mode possesses such a characteristic as well as low attenuation per unit distance and has been chosen as the transmission mode for the wave guide system.

However, since the circular electric mode is not the dominant mode in a round wave guide, many mode conversion problems are encountered with $TE_{01}$ mode transmission. Furthermore, it is desirable from loss considerations to propagate the $TE_{01}$ mode energy in wave guides which have physical dimensions larger than those dictated by cutoff considerations. Thus, the transmission medium is inherently multimode with respect to modes of higher order than the transmission mode as well as with respect to modes of lower order.

Having thus selected a transmission mode, it becomes necessary to devise methods and means particularly suited for transmitting wave energy in that mode. One outstanding advantage of the proposed wave guide systems is their extremely broad frequency band of operation. Typically, such systems will operate over frequency bands of 40 kilomegacycles. For purposes of regeneration and amplification, however, such transmission bands must be divided into many smaller channels. For example, a 40 kilomegacycle transmission band could be broken into 100 such channels each of about 400 megacycles width. Channel dropping filters capable of performing this function are disclosed, for example, in the copending application of E. A. J. Marcatili, Serial No. 678,182, filed August 14, 1957, now U.S. Patent 3,008,099, issued November 7, 1961. It may well be appreciated, however, that a sequence of 100 such channel dropping filters would raise problems of resonances, reflections and transmission losses. Such problems may be reduced by dividing the broad transmission band itself into several subbands prior to individual channel dropping.

It is well known that a frequency band may be split into two subbands by means of a microwave filter network comprising a pair of identical hybrid junctions interconnected via identical frequency selective filters. Such hybrid branching networks are disclosed, for example, in United States Patents 2,531,419 and 2,561,212, issued to A. G. Fox on November 28, 1950 and to W. D. Lewis on July 17, 1951, respectively. When the frequency band to be divided is of substantial width, however, special care must be taken in selecting the component hybrid junctions in order that their power dividing versus frequency characteristic is substantially uniform over the band. Additionally, the special problem of mode conversion losses from the circular electric mode must be carefully considered.

Accordingly, it is an object of the present invention to achieve hybrid operation in a circular electric mode wave guide structure over a broad frequency band.

It is a further object of the present invention to achieve wide band hybrid operation in a circular electric mode wave guide structure with low mode conversion losses.

The prior wave guide hybrid art has generally been restricted to operation according to general conductively bounded dominant mode wave guide propagation principles. Since the wave guides utilized in the long distance guide systems are multimode, however, it is advantageous if the various energy dividing operations necessary in such a system may likewise be achieved in multimode wave guide.

It is therefore a further object of the invention to achieve hybrid operation in a multimode wave guide structure.

In accordance with the present invention it has been discovered that circular electric mode wave energy propagating in a wave guide at frequencies substantially above the cutoff frequency exhibits significant optical propagation properties. Therefore, energy division principles heretofore restricted to free space propagation may be advantageously applied to energy division in conductively enclosed wave guide components. Furthermore, this application of optical principles does not destroy the mode purity of the $TE_{01}$.

Thus, a further aspect of the invention is the application of optical or quasi-optical principles in conductively bounded guides.

In accordance with one principal embodiment of the invention a wave guide cross is formed by the 90° intersection of a pair of conductively bounded wave guides of circular transverse cross section. Wave guide hybrid operation is obtained at frequencies substantially above the cutoff frequency by the introduction of a planar beam splitting member at the intersection of the crossed guides. The beam splitting member extends across the common volume occupied by the two guides at a 45° angle to each guide axis. The member may comprise a dielectric such as glass, a conductive mesh, or a conductive screen having a plurality of apertures therein. In the operation of the quasi-optical hybrid, energy entering at any one of the four ports is divided by the beam splitter such that one-half of the energy is transmitted directly therethrough to the opposite port and one-half of the energy is reflected thereby to a third port comprising one end of the other circular guide. Substantially no wave energy is reflected back toward the input and no wave energy is transmitted to the remaining one of the four ports.

The above and other objects of the present invention, its nature and its various advantages will become more readily apparent from consideration of the accompanying drawing in which.

Figure 1:
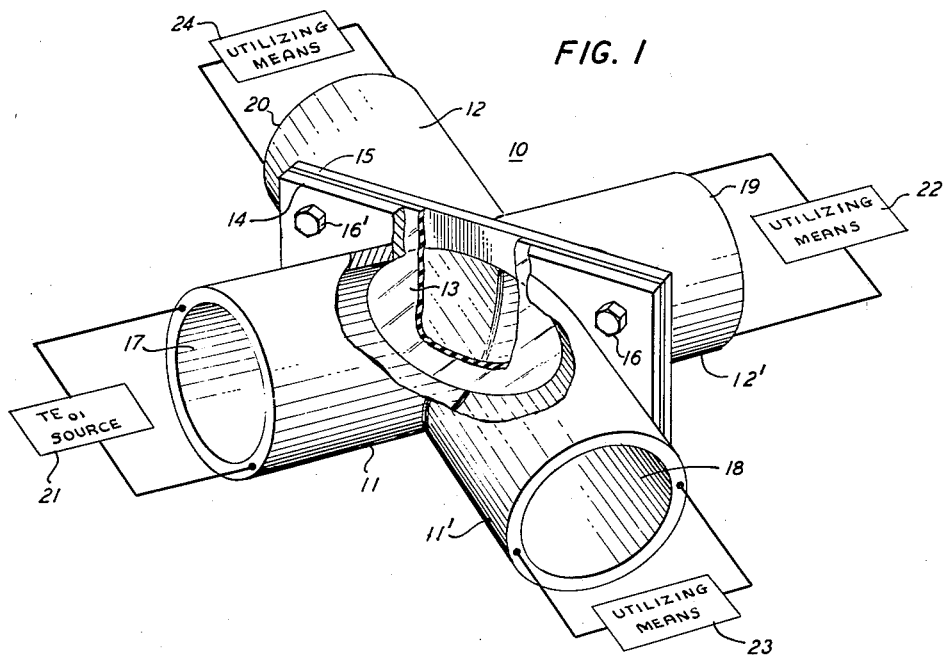
FIG. 1 is a partially broken away perspective view of a wave guide hybrid in accordance with the present invention.

Referring more particularly to FIG. 1, there is shown hybrid junction 10 in accordance with the invention comprising a pair of crossed wave transmission paths with energy dividing means 13 extending across their common volume. As particularly illustrated in FIG. 1 the crossed transmission paths comprise a pair of 90° circular wave guide elbows 11—11', 12—12' held together by connecting bolts 16, 16' in a pair of wave guide flanges 14, 15. Flanges 14, 15 are disposed at 45° with respect to the guide axes, thereby introducing the advantages of mechanical simplicity since the energy dividing means 13 may be positioned between, and held in place by, the flanges. However, the illustrated structure is intended to be illustrative only of one possible embodiment of the invention. Thus, the hybrid junction could comprise a first guide intersected on opposite sides at its midpoint by second and third aligned guides to form a cross. Energy dividing means 13 would then be properly positioned by some alternate means such as polyfoam spacers, for example.

When elbows 11—11', 12—12' are positioned together and secured by connecting bolts 16, 16' a device having ports 17, 18, 19, 20 results. The cutoff frequency of the guides comprising the four port device is substantially lower than the frequencies of excitation. Such a relationship causes the four port device to operate in accordance with quasi-optical principles. In embodiments of the invention built and tested, an inside guide diameter of two inches was utilized successfully at operating frequencies of from 35 to 80 kilomegacycles. Since a two-inch pipe diameter corresponds to a $TE_{01}$ mode cutoff frequency of 7.7 kilomegacycles, the above operating range represents frequencies at least five times the cutoff frequency.

Figure 2:
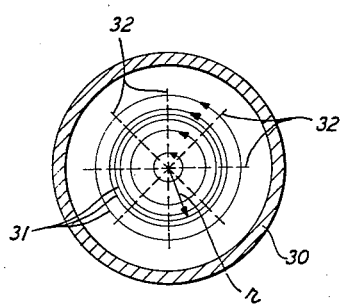
FIGS. 2 and 3 are wave mode diagrams given for purposes of explanation.

The significance of the large multimode guide may be more clearly understood from reference to FIG. 2 which is a transverse cross sectional view of a circular guide 30 supporting the $TE_{01}$ wave mode. In FIG. 2 electric field lines are represented by solid circular lines 31 and magnetic field lines by dashed radial lines 32. As may be seen in FIG. 2, the $TE_{01}$ wave mode is characterized by a maximum field intensity at a radius $r$ which is substantially less than the guide radius, and by a low field intensity at the inner guide surface. As the frequency of operation is increased further above the $TE_{01}$ cutoff frequency in the guide, the energy is concentrated more and more toward the center of the guide and, as a result, the energy intensity at the guide surface is reduced. Theoretically, the magnetic field lines associated with wave guide transmission modes always form closed loops. Thus, in FIG. 2 the H field lines 32 would have portions extending longitudinally along the inner surface of guide 30. However, at frequencies far from cutoff, the field intensity at the wall is so low that this longitudinal magnetic field may be neglected for practical purposes. The classical theory of wave propagation in closed wave guides has involved the assumption that energy rays are angularly related to, and therefore are continually being reflected along, the conductive guide walls. At the cutoff frequency, the rays are perpendicular to the guide walls and no forward longitudinal propagation occurs. As the operating frequency is increased above cutoff, however, the angle of incidence upon the guide wall becomes smaller and smaller. If the frequency is far above cutoff, the angle becomes substantially zero, the longitudinal magnetic field may be neglected, and the energy rays may be said to be propgating substantially parallel to the guide axis. It is such an operating condition which represents quasi-optical operation in accordance with the present invention.

Returning now to FIG. 1, it may be seen that energy dividing means 13 extends across the common volume occupied by the cross transmission paths at a 45° angle to the wave guide axes. The function of member 13 is to cause energy incident thereon to split into two portions, one portion being transmitted straight through the member, the remaining portion being reflected from the member at a 90° angle with respect to the direction of the transmitted portion. As illustrated in FIG. 1, member 13 comprises a dielectric sheet, which may comprise Corning cover glass with a dielectric constant of 6. For a uniformly thick dielectric member, its optimum thickness between parallel plane surfaces is approximately one quarter wavelength at midband frequency.

As a circuit element, hybrid 10 operates to divide wave energy incident on member 13 from port 17, for example, into two equal portions which exit from ports 18 and 19. No energy exits from port 20. Alternately, energy incident upon member 13 from port 18 exits in equal parts from ports 17 and 20, no energy exiting from port 19. Analogous energy diversion occurs for excitation of ports 19 or 20.

Figure 3:
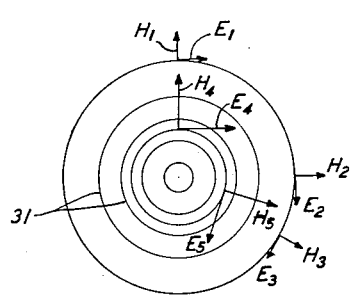
Figure 4:
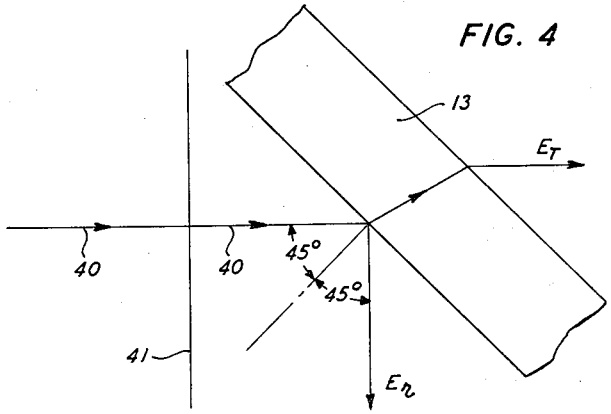
FIG. 4 is a semischematic view of a portion of the hybrid illustrating the energy dividing action.

In typical operation of the quasi-optical hybrid described above, energy in the $TE_{01}$ circular electric wave mode from source 21 excites port 17 and propagates to the right along guide 11 and is incident upon member 13. Mathematically, the description of the nature of the energy division in member 13 is somewhat complex. However a simplified description of the operation of the hybrid may be gained by reference to FIGS. 3 and 4 of the drawing. As set out above, when the guide is operating far from cutoff, the longitudinal magnetic field component may be neglected, and one may therefore consider the circular electric wave field to be composed of a plurality of plane waves of different polarizations, as shown in FIG. 3. In FIG. 3 the circular loops 31 again represent the electric field of the wave, and the vectors, designated as $H_n$, $E_n$, represent instantaneous values of the plane wave field at the points of intersection of each pair of vectors. Since the point values of E and H are constant in magnitude for a given radius, each separate plane wave will have the same E and H magnitudes at a given radius. Utilizing this factor, an expression for the transmitted and reflected portions of the incident wave could be calculated by plane wave analysis. However, experiments have demonstrated that an equal power division may be obtained in such a structure with low reflection back toward the energy source and with low mode conversion. A qualitative visualization of the transmission-reflection process may be had from consideration of FIG. 4, in which is shown a small portion of member 13 together with vectors indicating the propagating wave energy. In FIG. 4 vector 40 indicates the direction of travel of a plane wave 41 approaching energy splitting device 13 in a plane perpendicular to the plane of the paper. All the incident waves, regardless of their various polarizations as illustrated in FIG. 3, lie in planes normal to the plane of the paper and parallel to plane wave 41.

Thus, although the axis of propagation of each plane wave is oriented at a 45° angle with respect to the surface of member 13, the angle of incidence of each incremental part of the incident wave varies as a function of its incremental polarization within the planes normal to the paper. For example, plane wavelet $E_1$ in FIG. 3 would be incident upon member 13 at an angle of 0° while plane wavelet $E_2$ would be incident at a 45° angle. Since the reflection coefficient associated with energy incident upon member 13 is in part dependent upon its angle of incidence, it may easily be appreciated that the local reflection coefficients vary across the face of member 13. Therefore, an ideal beam splitting member would be one in which the local reflection coefficients were everywhere equal. Such a member would require that either or both the thickness of the splitting member vary as a function of the incremental angle of energy incidence or that its dielectric constant vary thusly. However, mode conversion losses associated with uniformly thick beam splitters of uniform dielectric constant is of a low level. Upon incidence on member 13, the energy splits into two parts, the reflected energy represented by vector $E_r$ leaving beam splitter 13 at a 45° angle with respect to its surface while the transmitted energy, after passing through member 13 with its attendant refraction, exiting as vector $E_t$ traveling with an axis parallel to that of the incident wave.

Returning now to FIG. 1, the energy from source 21 is split into two portions by member 13 as described above and one portion passes to utilizing means 22 associated with guide portion 12′, while the other portion passes to utilizing means 23 associated with guide portion 11′.

Port 20 represents the conjugate arm of hybrid 10, and ideally no energy exits from this port when port 17 is excited. As shown in FIG. 1, however, utilizing means 24 is associated with port 20. As will be seen from FIG. 5, utilizing means 24 may comprise external circuitry having utility in combination with hybrid 10.

Figure 5:
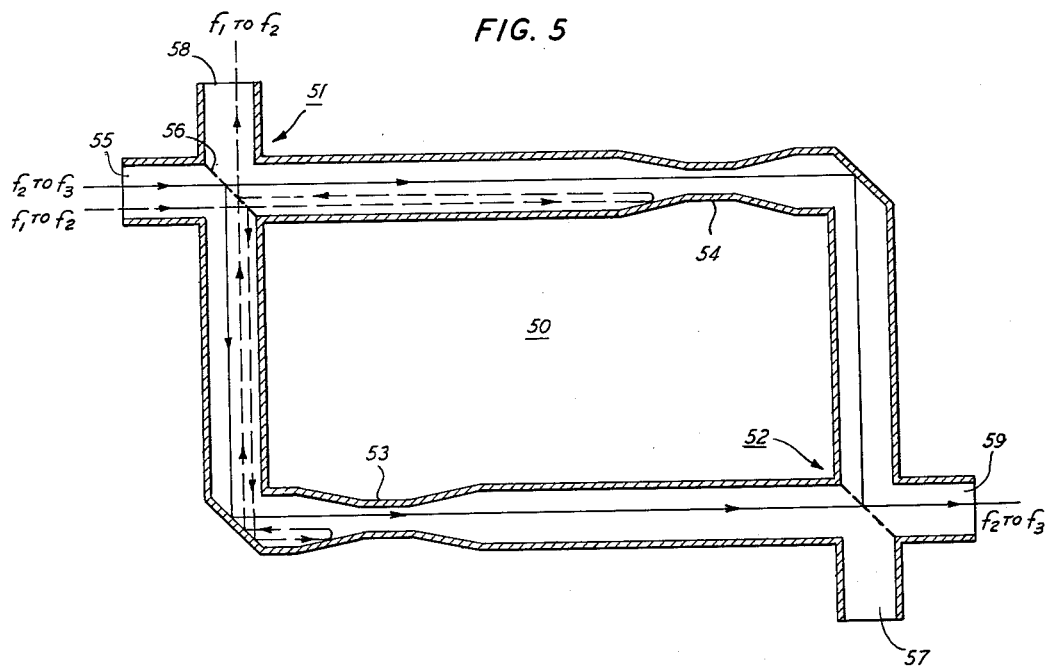
FIG. 5 is a plan view of a band splitting filter incorporating hybrids in accordance with the invention.

FIG. 5 represents a constant resistance band splitting filter 50 employing hybrid junctions in accordance with the present invention. Essentially the filter consists of a pair of hybrids 51, 52 interconnected through a pair of high pass filters 53, 54 via paths of identical lengths. Wave energy in a broad frequency band extending from $f_1$ to $f_3$ enters at port 55. In hybrid 51 this energy is split into a first portion which travels through the beam splitting device 56 and a second portion which is reflected downward from beam splitter 56. When this energy reaches high pass filters 53, 54, which may be simple tapered wave guide sections, frequencies $f_2$ to $f_3$, which are above the cutoff frequency of the tapered section, pass through and are recombined in hybrid 52 to exit at port 59. Frequencies $f_1$ to $f_2$, however, are below the cutoff frequencies of filters 53, 54 and are, therefore, reflected back toward hybrid 51 in which the energy recombines and exits at port 58. The path lengths between the splitting members must be identical for all frequencies in order that the phase relationships at these members be such that no energy exits at port 57 or is reflected back toward input port 55. For frequencies above the cutoff frequency of filters 53, 54, the path lengths are automatically equal if the horizontal guide lengths are equal and the vertical guide lengths are equal. For frequencies below the cutoff frequency of filters 53, 54, however, it is necessary that the path length from dividing member 56 to filter 54 be equal to the path length from member 56 to filter 53. As shown in FIG. 5 a skew positioning of the filters is necessary to achieve such equal path lengths.

Figure 6:
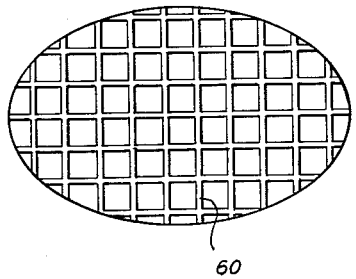
FIGS. 6 and 7 illustrate alternate energy dividing members for use in the hybrid junction.
Figure 7:
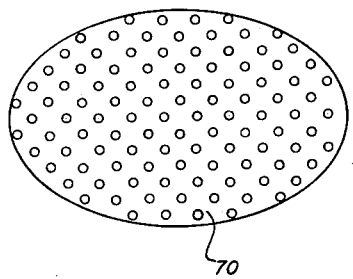

FIGS. 6 and 7 illustrate beam splitting structures which may be used as alternates to the dielectric member described in connection with FIGS. 1 and 4. In FIG. 6 is shown a copper mesh screen 60. When dielectric member 13 is replaced with mesh 60, beam division and hybrid operation essentially as described above is realizable. One form of screen which has proved effective comprises electroformed copper mesh having a thickness of one-half mil and having 400 square holes per square inch. The copper separating the holes was 17.5 mils thick. Alternatively, and as shown in FIG. 7, the beam splitter may comprise a metal sheet 70 perforated with small round holes. The relative power transmission-reflection would be controlled by varying the number, spacing and size of the holes. Electrically, such a perforate plate is similar to the mesh screen shown in FIG. 6.

It should be noted that the above described hybrid junction could alternately be described as a 3 decibel directional coupler. Thus if coupling devices for circular electric mode wave energy having other than equal power division were desired, the only change necessary in the above described hybrid would be to change the reflectivity characteristics of the planar energy splitting device 13. A directional coupler exhibiting any desired ratio of power division could thus be realized.

In all cases it is to be understood that the above described arrangements are merely illustrative of the many specific embodiments which can represent applications of the principles of the present invention. Numerous and varied other arrangements can readily be devised by those skilled in the art in accordance with these principles without departing from the spirit and scope of the invention.

What is claimed is:

1. A millimeter wave hybrid junction comprising first and second intersecting wave guides,
    said wave guides extending completely through one another to form a device having first, second, third, and fourth ports,
    means for exciting said first port in the $TE_{01}$ circular electric wave mode within a given range of operating frequencies,
    means for dividing said energy when incident upon the common volume occupied by said first and said second guides into two substantially equal portions,
    said dividing means comprising a planar member extending across said common volume at a 45° angle with respect to the coplanar axes of said guides,
    and means for utilizing said wave energy associated with said second and third ports.

2. The hybrid junction according to claim 1 in which the lowest frequency in said range of operating frequencies is at least four times the cutoff frequency for the $TE_{01}$ wave mode in said first and second wave guides.

3. The hybrid junction according to claim 1 in which said planar member comprises a dielectric such as glass.

4. The hybrid junction according to claim 1 in which said planar member comprises a conductive mesh screen.

5. The hybrid junction according to claim 1 in which said planar member comprises a perforate conductive plate having round apertures therein.

6. In combination, a first section of circular wave guide having first and second terminal ends and a longitudinal axis of propagation,
    means for applying a broad frequency band of wave energy in the circular electric wave mode to said first terminal end,
    a second section of circular wave guide having third and fourth terminal ends and a longitudinal axis of propagation coplanar with the axis of said first section,
    said first and said second wave guide sections intersecting between said terminal ends at a 90° angle,
    a semitransparent planar member extending across the common volume occupied by said guide sections,
    said member being disposed at an angle of 45° with respect to said axes and passing through the point of intersection thereof,
    and energy receiving means electrically asociated with said second, third, and fourth terminal ends.

7. The combination according to claim 6 in which said planar member comprises a dielectric sheet having an electrical thickness of substantially one-quarter wavelength of said wave energy at midband frequency.

8. An energy coupling device for electro-magnetic wave energy in the circular electric wave mode within a given range of operating frequencies comprising
 a first uniform round wave guide adapted to support the circular electric wave mode,
 a second uniform round wave guide also adapted to support said wave mode,
 said second guide intersecting said first guide at a 90° angle and extending completely therethrough to occupy a common volume therewith and to form a device having first, second, third, and fourth ports,
 the lowest frequency in said range of operating frequencies being at least four times the cutoff frequency for the $TE_{01}$ wave mode in said first and second wave guides,
 and means for dividing wave energy propagating into said common volume into two portions,
 said dividing means comprising a planar member extending acros said common volume at a 45° angle with respect to the coplanar axes of said guides.

References Cited in the file of this patent

UNITED STATES PATENTS 2,299,619     Fritz  ---------------- Oct. 20, 1942